United States Patent
Taupin et al.

(10) Patent No.: US 12,371,163 B2
(45) Date of Patent: Jul. 29, 2025

(54) UNMANNED AERIAL SYSTEM FOR TRANSPORTING AND DELIVERING PACKAGES, LOGISTICS METHOD IMPLEMENTED IN THIS SYSTEM AND AEROSTATIC DEVICE INTEGRATED IN THIS SYSTEM

(71) Applicants: Sébastien Taupin, Paris (FR); Sylvain Allano, Montlhéry (FR)

(72) Inventors: Sébastien Taupin, Paris (FR); Sylvain Allano, Montlhéry (FR)

(*) Notice: Subject to any disclaimer, the term of this patent is extended or adjusted under 35 U.S.C. 154(b) by 51 days.

(21) Appl. No.: 17/904,558

(22) PCT Filed: Feb. 16, 2021

(86) PCT No.: PCT/FR2021/050270
§ 371 (c)(1),
(2) Date: Aug. 18, 2022

(87) PCT Pub. No.: WO2021/165610
PCT Pub. Date: Aug. 26, 2021

(65) Prior Publication Data
US 2023/0091234 A1 Mar. 23, 2023

(30) Foreign Application Priority Data
Feb. 18, 2020 (FR) ...................... 2001602

(51) Int. Cl.
*B64D 3/00* (2006.01)
*B64U 10/14* (2023.01)
(Continued)

(52) U.S. Cl.
CPC ............... *B64D 3/00* (2013.01); *B64U 10/14* (2023.01); *B64U 70/20* (2023.01); *B64U 10/30* (2023.01); *B64U 2101/64* (2023.01)

(58) Field of Classification Search
CPC .......... B64U 10/30; B64U 80/50; B64B 1/00; B64B 1/58; B64B 1/70; B64F 1/14; B64F 1/32; B64F 1/322; B64F 5/50; B64D 1/22
See application file for complete search history.

(56) References Cited

U.S. PATENT DOCUMENTS 5,901,922 A * 5/1999 Aurilio .................. G01W 1/08
244/31
9,825,644 B2 11/2017 Kim
(Continued)

FOREIGN PATENT DOCUMENTS

| CN | 205186504 | 4/2016 |
| CN | 206351780 | 7/2017 |

(Continued)

OTHER PUBLICATIONS

Translation of DE-10203431-A1 (Year: 2003).*
(Continued)

*Primary Examiner* — Joshua J Michener
*Assistant Examiner* — Ryan Andrew Yankey
(74) *Attorney, Agent, or Firm* — TraskBritt

(57) ABSTRACT

An unmanned aerial system for transporting and delivering packages, comprises an unmanned motorized aircraft and a non-motorized aerostatic device having aerostatic lift and being able to be coupled to the motorized aircraft, for transporting at least one package from a take-off site to a delivery site. This aerial system cooperates with a site for storing and distributing aerostatic modules each having a predetermined modular aerostatic lift, the storage and distribution site being located in the vicinity of the take-off site and being configured to deliver a set of j aerostatic modules on demand, which modules are secured by coupling means, so as to supply an aerostatic device with static lift that is (Continued)

substantially greater than or equal to the overall weight of the package to be transported and of the aerostatic device.

10 Claims, 5 Drawing Sheets

(51) Int. Cl.
  *B64U 10/30* (2023.01)
  *B64U 70/20* (2023.01)
  *B64U 101/64* (2023.01)

(56) References Cited

U.S. PATENT DOCUMENTS

| | | | |
|---|---|---|---|
| 9,852,644 | B2 | 12/2017 | Salnikov et al. |
| 10,246,186 | B1 | 4/2019 | Beckman et al. |
| 10,267,949 | B2 | 4/2019 | Narabu |
| 11,475,778 | B1 * | 10/2022 | Kaneria .................. H04W 4/02 |
| 2016/0378108 | A1 * | 12/2016 | Paczan .................. B64U 20/00 705/330 |
| 2020/0050200 | A1 | 2/2020 | Torii et al. |
| 2020/0079487 | A1 * | 3/2020 | Shim ........................ B64B 1/34 |
| 2024/0059415 | A1 * | 2/2024 | Oqab ....................... B64D 5/00 |

FOREIGN PATENT DOCUMENTS

| | | | | |
|---|---|---|---|---|
| CN | 107021199 | A * | 8/2017 | ............... B64B 1/00 |
| CN | 107839882 | A | 3/2018 | |
| DE | 10007293 | A1 * | 1/2002 | ............... B64B 1/06 |
| DE | 10203431 | A1 * | 8/2003 | ............... B64B 1/06 |
| DE | 102015008900 | A1 * | 1/2017 | |
| EP | 3013686 | | 4/2017 | |
| FR | 2581022 | A1 * | 10/1986 | |
| WO | WO-2013189849 | A1 * | 12/2013 | ............... B64B 1/40 |

OTHER PUBLICATIONS

Translation of CN 107021199 A (Year: 2017).*
International Search Report for International Application No. PCT/FR2021/050270 dated May 28, 2021, 2 pages.
International Written Opinion for International Application No. PCT/FR2021/050270 dated May 28, 2021, 7 pages.

* cited by examiner

FIG. 2C

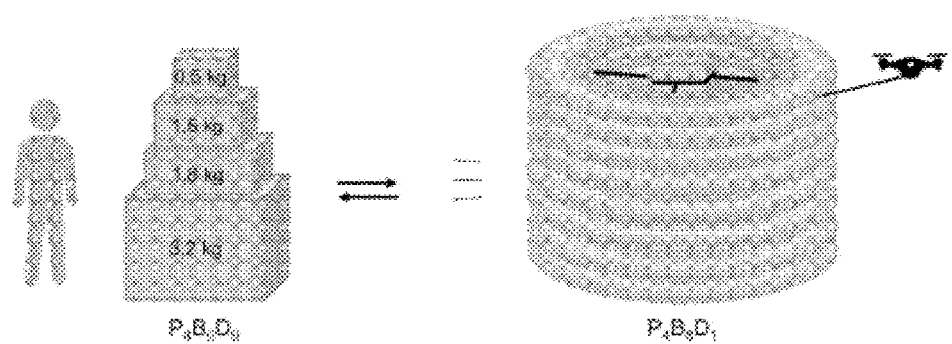
FIG. 6A
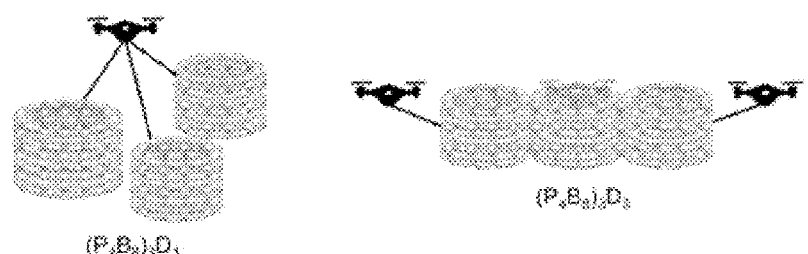
FIG. 6B
FIG. 6C

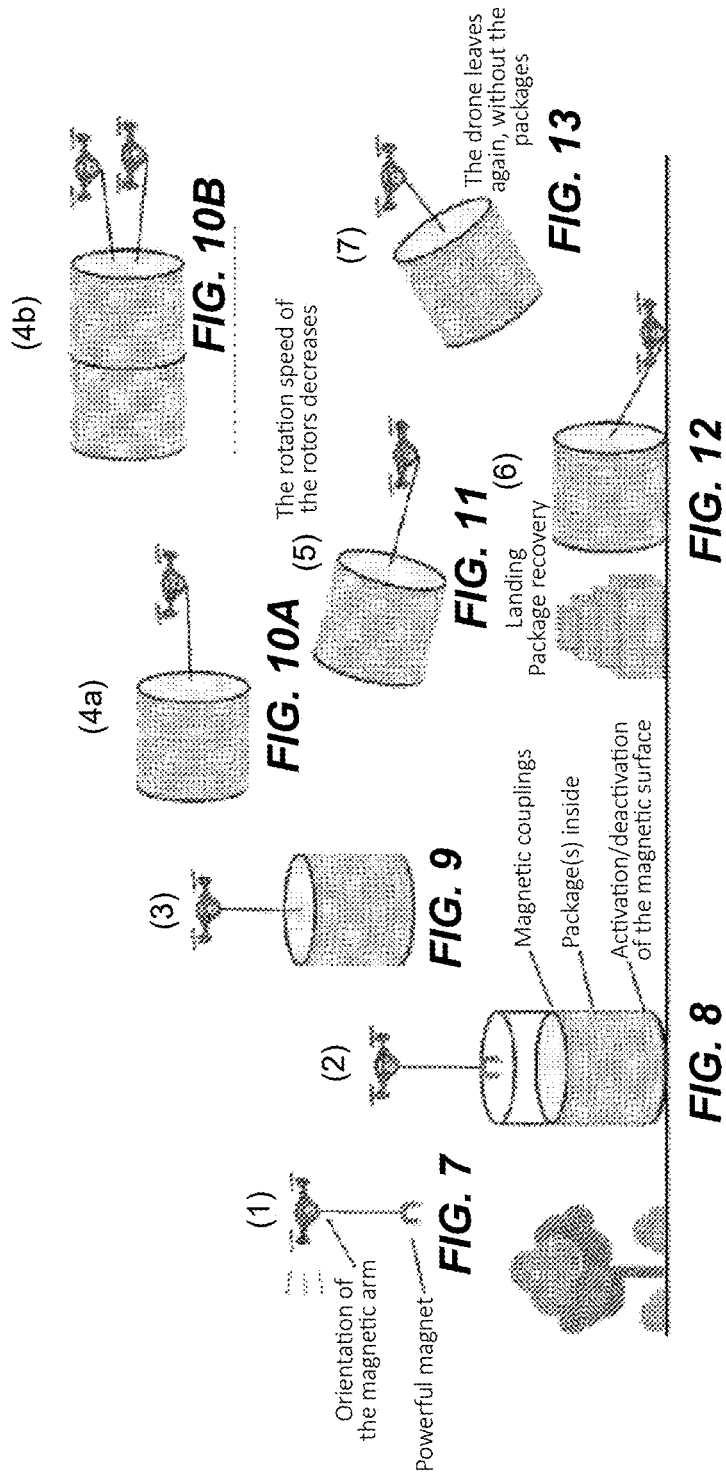

UNMANNED AERIAL SYSTEM FOR TRANSPORTING AND DELIVERING PACKAGES, LOGISTICS METHOD IMPLEMENTED IN THIS SYSTEM AND AEROSTATIC DEVICE INTEGRATED IN THIS SYSTEM

CROSS-REFERENCE TO RELATED APPLICATIONS

This application is a national phase entry under 35 U.S.C. § 371 of International Patent Application PCT/FR2021/050270, filed Feb. 16, 2021, designating the United States of America and published as International Patent Publication WO 2021/165610 A1 on Aug. 26, 2021, which claims the benefit under Article 8 of the Patent Cooperation Treaty to French Patent Application Serial No. FR2001602, filed Feb. 18, 2020.

TECHNICAL FIELD

The present disclosure relates to an unmanned aerial system for transporting and delivering packages. It also relates to a logistics method implemented in this system, as well as an aerostatic device integrated in this system.

The field of the present disclosure is that of logistics and the distribution of goods, in particular packages.

BACKGROUND

To date, there are many drone-based systems for transporting and delivering packages and objects. These drone-based systems all have the disadvantage of having a reduced autonomy, and therefore a limited range.

U.S. Patent Application Publication US2016/0378108A1 discloses a collective unmanned aerial vehicle (UAV) system in which multiple UAVs can be coupled together to form the collective UAV. Rather than using a single large UAV to carry a larger or heavier item, multiple smaller UAVs can be coupled together to form a collective drone that is used to carry the larger or heavier item.

Chinese Patent Application Publication CN205186504U discloses a drone comprising a helium balloon and a high-strength light gas tube connected to the bottom of the surface of the helium balloon.

Chinese Patent Application Publication CN206351780U discloses an unmanned aircraft carrier based on a ground station and a helium balloon, mainly comprising a ground station part, a helium balloon part, an unmanned aircraft part and a pipeline connection.

U.S. Pat. No. 9,852,644B2 discloses a hybrid airship drone having both passive lift provided by a gas balloon and active lift provided by propellers.

Chinese Patent Application Publication CN107839882A discloses an unmanned aircraft suspended in the air by a levitation device. In the event of engine failure, the transported goods are not damaged.

U.S. Pat. No. 10,267,949B2 discloses a flight vehicle comprising a balloon filled with a gas lighter than air permanently coupled to a propulsion system carrying an imaging unit intended to record images of interest and a control unit. The control unit is configured to perform control movement of the flight vehicle on the basis of at least one of information relating to the flight vehicle and information of surroundings of the flight vehicle, and to perform control to record the image data generated by the imaging unit.

U.S. Pat. No. 10,246,186B1 discloses an unmanned aerial vehicle (UAV) comprising an inflatable membrane and a compressed gas chamber containing a gas such as helium to inflate the membrane. When the UAV is approaching or departing from a location where noise reduction is desirable (for example, a delivery location), the membrane can be inflated to increase the buoyancy of the UAV and to allow the propulsion system to be used with less thrust, and therefore less noise. Once the UAV has departed and reached a certain distance from the location, the membrane can be deflated and retracted to a UAV storage area.

The object of the present disclosure is to propose a new concept of an unmanned aerial system for transporting and delivering goods, which offers much greater autonomy than that of current civilian drones.

Definitions

Drone: Unmanned motorized aircraft
Balloon or aerostat: Non-motorized aerostatic device
Aerostatic lift: Force opposing the weight of the air displaced by a balloon or aerostat $$F = \rho \cdot g \cdot V$$

$\rho$: density of the air displaced by the balloon [kg/m$^3$]
V: volume of air displaced by the balloon [m$^3$]
g: acceleration due to gravity [m/s$^2$]

BRIEF SUMMARY

This objective is achieved with an unmanned aerial system for transporting and delivering packages, comprising:
  at least one unmanned motorized aircraft, such as a propulsion drone,
  at least one non-motorized aerostatic device having aerostatic lift and being able to be coupled to the at least one motorized aircraft,
  the at least one motorized aircraft and the at least one non-motorized aerostatic device cooperating to transport at least one package from a take-off site to a delivery site, and the at least one aerostatic device being configured so that its aerostatic lift is substantially greater than or equal to the overall weight of the at least one package to be transported and of the aerostatic device.

According to the present disclosure, the aerial system cooperates with at least one site for storing and distributing aerostatic modules each having a predetermined modular aerostatic lift, the storage and distribution site being located in the vicinity of the take-off site and being configured to deliver a set of j aerostatic modules on demand, which modules are secured by coupling means, so as to supply an aerostatic device made up of the j aerostatic modules and having a static lift that is substantially greater than or equal to the overall weight of the package to be transported and of the aerostatic device.

The aerial package transport systems according to the present disclosure will thus have no speed limitation (it suffices to add propulsion drones to be faster), no range limitation (it suffices to replace the drones when the energy is low), no payload limitation (it suffices to add balloons for lift), and they are environmentally friendly, owing, in particular, to the reuse of the aerostatic devices.

In a particular embodiment of an aerial system according to the present disclosure, the storage site is further configured to deliver a set of j modules so as to provide an aerostatic device having a static lift substantially greater than or equal to the overall weight of the at least one package, the aerostatic device and the at least one motorized aircraft.

In this embodiment, the motorized aircraft is freed from the burden of supporting its own weight and can thus use all of its onboard energy for the propulsion of the aerial system.

The at least storage and distribution site may comprise means for coupling the aerostatic device resulting from the j secured aerostatic modules to the motorized aircraft.

The aerial system according to the present disclosure can cooperate with at least one site for the recovery and storage of aerostatic modules, this recovery and storage site being located close to the delivery site and being configured to collect the j aerostatic modules previously decoupled from motorized aircraft.

The recovery and storage site may comprise means for decoupling the aerostatic device from the motorized aircraft.

The aerial system according to the present disclosure may further comprise means for separating the j aerostatic modules.

At least one distribution and storage site can be configured to also provide the recovery and storage functions.

At least one storage and distribution site and/or at least one recovery and storage site may comprise a silo arranged to store a stack of aerostatic modules.

The aerostatic modules can comprise a support structure of toroidal geometry and can be filled with a gas lighter than air.

At least one support structure may comprise means for receiving at least part of the motorized aircraft carrying a package, in a central part of the support structure, and means for coupling the motorized aircraft to the support structure.

At least one support structure may comprise means for receiving the at least one package in a central part of the support structure.

At least one support structure may comprise means for securing the motorized aircraft to the aerostatic module.

The aerial system according to the present disclosure can cooperate with a control and processing site provided for calculating a transport strategy adapted to each package intended to be transported from a take-off site to a delivery site.

The control and processing site may comprise means for determining, depending on the weight of the package to be delivered and the take-off site, the number of aerostatic modules to be distributed and the storage and distribution site to be used, and means for controlling a sequence for coupling the motorized aircraft to the aerostatic device on the storage and distribution site.

The control and processing site may further comprise means for determining, as a function of a desired delivery speed, the number of additional motorized aircraft to be distributed and to be coupled to the aerial system, in order to increase the speed of the aerial systems and thus speed up the delivery. These additional motorized aircraft could be stored, for example, nearby.

The control and processing site can further comprise means for controlling a sequence for decoupling the motorized aircraft from the aerostatic device on the recovery and storage site.

According to another aspect of the present disclosure, proposed is a method for the air transport of packages, implemented in an aerial system according to the present disclosure for the transport and delivery of at least one package from a take-off site to a delivery site comprising coupling at least one unmanned motorized aircraft with at least one non-motorized aerostatic device having aerostatic lift, the at least one motorized aircraft and the at least one non-motorized aerostatic device cooperating to transport at least one package from a take-off site to a delivery site.

The transport method according to the present disclosure further comprises a transfer sequence from the motorized aircraft to a site for storing and distributing aerostatic modules each having a predetermined modular aerostatic lift, the storage and distribution site being located in the vicinity of the take-off site and being configured to deliver a set of j aerostatic modules on demand, which modules are secured by coupling means, so as to supply an aerostatic device made up of the j aerostatic modules and having a static lift that is substantially greater than or equal to the overall weight of the package to be transported and of the aerostatic device.

In a particular embodiment of the transport method according to the present disclosure, the sequence for configuring the aerostatic device from a combination of j aerostatic modules is further arranged so that the lift of the aerostatic device thus configured is substantially greater than or equal to the overall weight of the package, of the aerostatic device and of the at least one motorized aircraft.

During the transfer sequence, the motorized aircraft can carry the package to be delivered. The package to be delivered can also be attached to the aerostatic device beforehand.

The transport method according to the present disclosure may further comprise a sequence for coupling the aerostatic device with the motorized aircraft, followed by a sequence for transporting the package to be delivered by the coupled assembly [Aerostatic device—Motorized aircraft].

The transport method according to the present disclosure may further comprise a sequence for decoupling the motorized aircraft from the aerostatic device on a recovery and storage site for aerostatic modules located close to the delivery site and configured to collect the j aerostatic modules.

This method can also comprise, following the decoupling sequence, a sequence for transporting the package by the motorized aircraft from the recovery and storage site to the delivery site.

The package can also be made available at the recovery and storage site.

The transport method according to the present disclosure may further comprise a sequence for configuring an aerostatic device from a combination of j aerostatic modules so that the lift of the aerostatic device thus configured is substantially greater than or equal to the overall weight of the package and of the aerostatic device, as well as an initial sequence for calculating a transport strategy adapted to each package intended to be transported from a take-off site to a delivery site.

The initial sequence may comprise a step to determine, depending on the weight of the package to be delivered and the take-off site, the number of aerostatic modules to be distributed and the storage and distribution site to be used, and a step to check a coupling of the motorized aircraft to the aerostatic device on the storage and distribution site.

The transport method according to the present disclosure can further comprise a step to distribute at least one additional motorized aircraft and to couple it to the aerial system according to the present disclosure.

Provision can be made for a step of the logistics method to be registered on a blockchain in such a way as to make the data of the step immutable, transparent and timestamped.

According to yet another aspect of the present disclosure, proposed is a non-motorized aerostatic device implemented in an unmanned aerial system for transporting and delivering packages, adapted to be coupled to at least one unmanned motorized aircraft and to cooperate with the motorized aircraft to transport at least one package from a take-off site to a delivery site, the at least one aerostatic device being configured so that its aerostatic lift is substantially greater than or equal to the cumulative weight of the at least one package to be transported and the aerostatic device.

This aerostatic device can advantageously be made from a set of aerostatic modules each having a predetermined modular aerostatic lift, so as to obtain a static lift substantially greater than or equal to the cumulative weight of the package to be transported, of the aerostatic device and of the at least one motorized aircraft.

The aerostatic modules constituting the aerostatic device can advantageously be arranged to produce a container intended to receive one or more packages therein.

BRIEF DESCRIPTION OF THE DRAWINGS

The present disclosure will be better understood in view of the figures, in which:

FIGS. 6A-6C illustrate several possible configurations of an aerial system according to the present disclosure, for transporting and delivering a set of packages; and FIGS. 7-13 illustrate a practical embodiment of an aerial system according to the present disclosure, for aerial delivery of several packages over a long distance.

DETAILED DESCRIPTION

Figure 1:
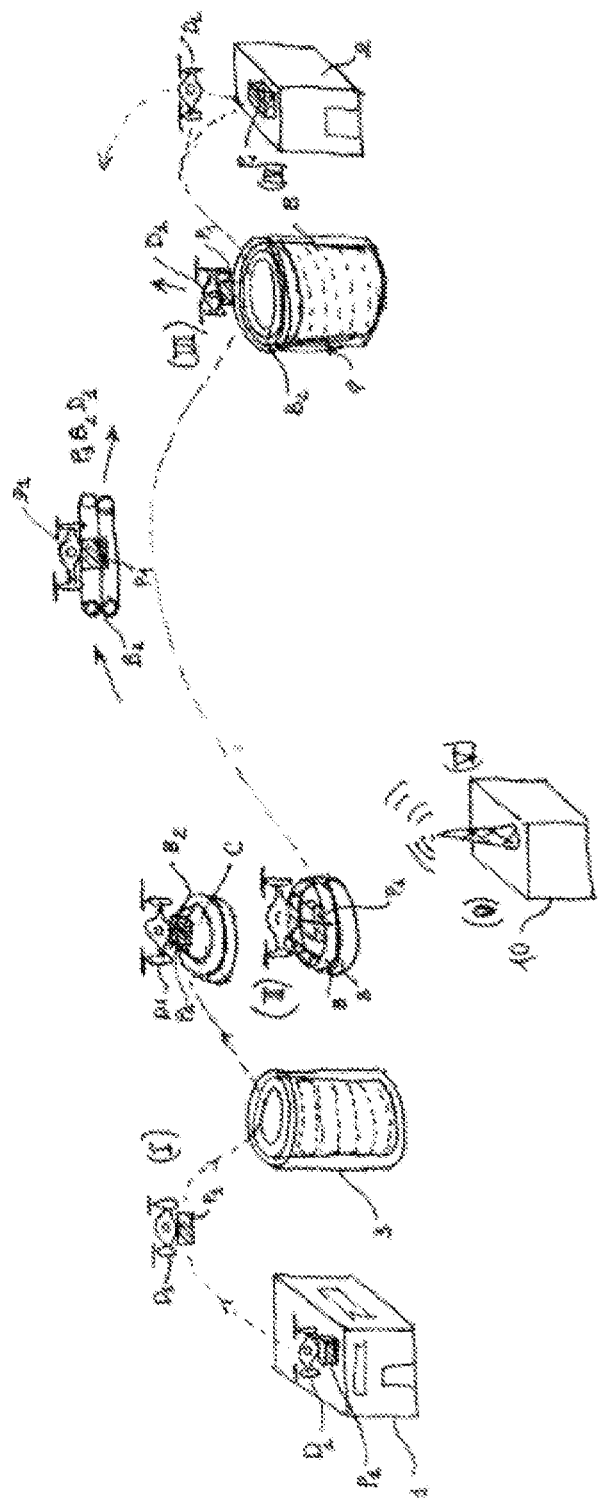
FIG. 1 is a block diagram of an example of operation of an aerial transport system according to the present disclosure.

With reference to FIG. 1, an unmanned aerial system for transporting and delivering packages according to the present disclosure $P_1B_2D_1$ comprises a drone $D_1$ as unmanned motorized aircraft, a set of two inflatable modules B joined together and filled with helium as non-motorized aerostatic device $B_2$, and a package $P_1$ to be delivered from a take-off site 1 to a delivery site 2.

The drone $D_1$ can be, for example, a quadcopter and the two modules B filled with helium can have the shape of toroids provided with a central recess adapted to receive one or more packages and a controlled stowage system of the drone $D_1$.

A control and processing site 10 is dedicated to managing a fleet of aerial systems according to the present disclosure. This site is responsible for, in particular, defining a transport and delivery strategy for a package or set of packages. It will determine, in particular, the number of aerostatic modules necessary to compensate for the weight of one or more packages by their cumulative aerostatic lift, which is equal to the sum of the modular aerostatic lift of these aerostatic modules.

A description will now be given, still with reference to FIG. 1, of a practical embodiment of the method for transporting and delivering packages according to the present disclosure.

After an initial sequence (0) of defining a strategy adapted to the delivery request for a package, developed on the control and processing site (10), a drone $D_1$ is controlled to take charge of a package $P_1$ at the take-off site 1. This control can be carried out either by a human operator or in automatic mode. The package $P_1$ can be secured to the drone $D_1$ by known and available controlled mechanical means.

The drone $D_1$ carrying the package $P_1$ is then controlled (sequence I) to reach a site 3 for storing and distributing aerostatic modules. This site 3, for example, comprises a distributor cylinder filled with aerostatic modules previously inflated with a gas lighter than air, such as helium, and having a closed or open toroidal-type geometry. When the drone $D_1$ approaches the upper part of the distributor cylinder, it is then controlled to couple mechanically (sequence II) to two aerostatic modules, which are then released from the distributor cylinder and mechanically secured. The cumulative static lift of the two modules $B_2$, which is equal to the sum of their modular aerostatic lift, is necessarily greater than or equal to the combined weight of the package $P_1$ and of these two modules.

The aerial system $P_1B_2D_1$ thus constituted is then controlled to make a controlled journey to the delivery site 2. During this journey, the drone is largely relieved of the efforts to compensate for the weight of the package, which are now neutralized by the cumulative static lift of the two aerostatic modules $B_2$, and its energy is now mainly mobilized for the horizontal component of the flight and for flight dynamics to the delivery site 2. As a practical example, the drone thus coupled to the aerostatic modules has a range of 50 km with a speed of 5 km/hour, i.e., 5 times more than the range of a single drone at the same speed.

When the aerial system $P_1B_2D_1$ arrives above the upper part of a recovery and storage site 4 located close to the delivery site 2, it is then controlled to interact (sequence III) with decoupling means (not shown), which have the function of decoupling the drone $D_1$ from the two aerostatic modules $B_2$, which are then recovered in a collecting cylinder within the recovery and storage site 4. The drone $D_1$ carrying the package $P_1$ is finally controlled to reach the delivery site 2 and the package $P_1$ is then released (sequence IV) from the drone $D_1$, which can then resume other missions.

Figure 2A:
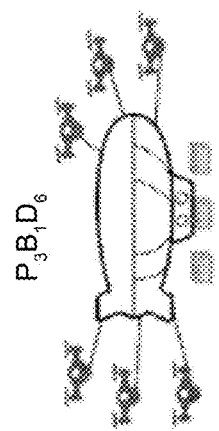
FIGS. 2A-2O illustrate possible configurations of aerial systems according to the present disclosure, combining one or more motorized aircraft $D_k$ and one or more aerostatic devices $B_j$, for transporting one or more packages Pi.
Figure 2B:
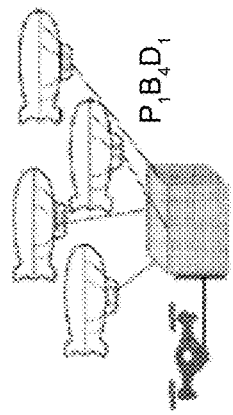
Figure 2D:
Figure 2E:
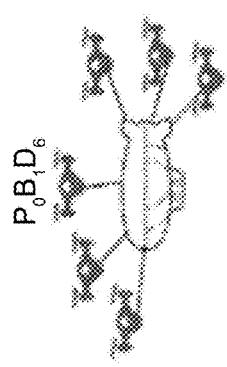
Figure 2F:
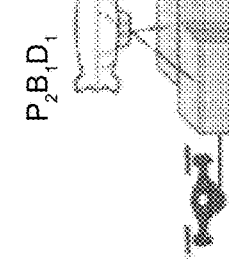
Figures 2G, 2H:
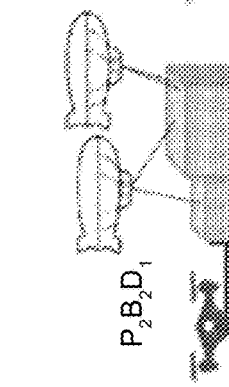
Figure 2I:
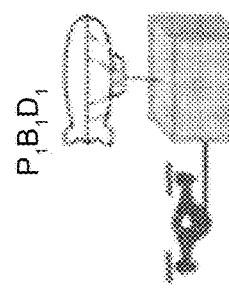
Figures 2J, 2K:
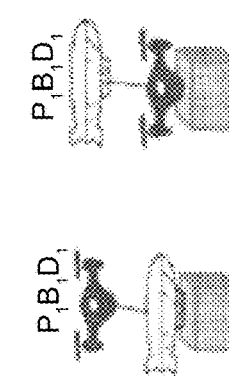
Figures 2L, 2M:
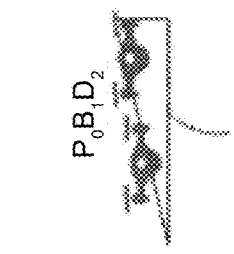
Figure 2N:
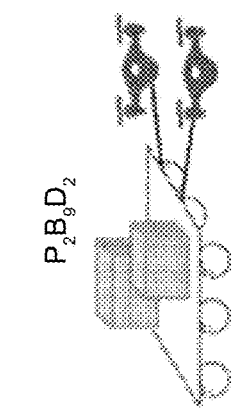
Figure 2O:
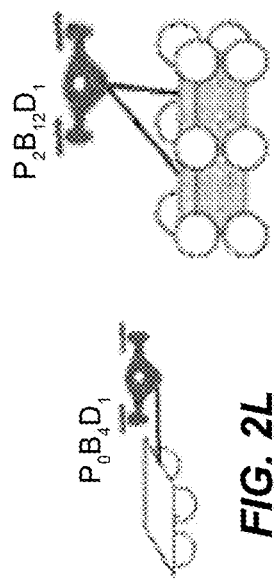
Figure 3:
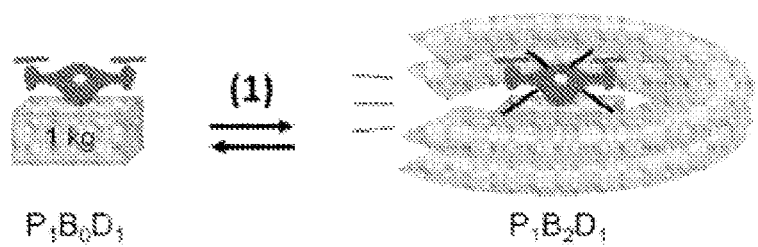
FIG. 3 illustrates a first embodiment of an aerial transport system according to the present disclosure in which the motorized aircraft is stowed inside the aerostatic device, in a configuration $P_1B_2D_1$.

With reference to FIGS. 2A-2O, numerous package-aerostat-drone configurations $P_iB_jD_k$ can be envisaged within the scope of the present disclosure. These configurations are, for example:

$P_1B_4D_1$ four aerostats support a package and a propulsion drone
    four aerostats lift a package that is towed by a drone
$P_3B_1D_6$ an aerostat carries three packages and is towed by six drones
$P_1B_1D_1$ an aerostat carries a package and a drone lifts this assembly an aerostat carries a drone carrying a package a drone tows a package carried by an aerostat $P_2B_2D_1$ two aerostats collectively carry two secured packages that are towed by a drone $P_2B_1D_1$ an aerostat carries two secured packages that are towed by a drone $P_2B_{12}D_1$ two secured packages are coupled to twelve spherical aerostatic modules and towed by a drone $P_2B_9D_2$ two packages are carried on a base by an assembly of nine spherical aerostats, the base being towed by two drones $P_3B_6D_2$ three packages are carried on a base supported by six aerostats and towed by two drones, one of which is temporarily active With reference to FIG. 3, an aerial system $P_1B_2D_1$ according to the present disclosure comprises a drone $D_1$ carrying a package $P_1$, for example, weighing 1 kg. It is coupled (1) to two non-motorized aerostatic modules $B_2$, which here have a horseshoe shape. A stowage system makes it possible to secure the drone $D_1$ and the two aerostatic modules $B_2$.

If the empty mass of these two modules is, for example, 100 g, the cumulative aerostatic lift of the two aerostatic modules, equal to the sum of their modular aerostatic lifts, must compensate for a weight of 1.1 kg, which implies that the cumulative volume of the two aerostatic modules must be greater than or equal to 1.1 m³.

Figure 4:
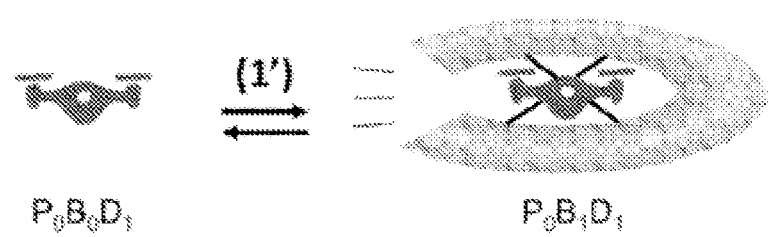
FIG. 4 illustrates a configuration $P_0B_1D_1$ of the aerial system according to the present disclosure, in which the motorized aircraft is coupled to the aerostatic device without carrying packages.

It is also possible to provide an aerial system according to the present disclosure in an empty configuration (without packages) $P_0B_1D_1$, as shown in FIG. 4. In this case, the coupling (1') of the drone $D_1$ to the aerostatic module $B_1$ of the same type as that of FIG. 3 results in providing this drone with a reduction corresponding to an equivalent thrust of 0.55 kg, which will allow an increased operational range of this drone.

Figure 5:
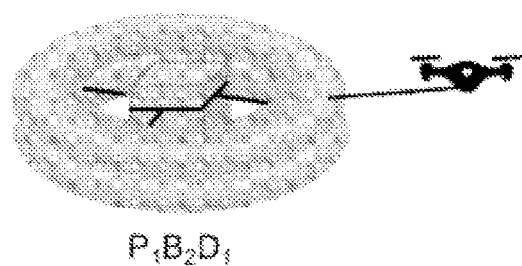
FIG. 5 illustrates a second embodiment of an aerial transport system according to the present disclosure in which the motorized aircraft tows the aerostatic device carrying a package, in a configuration $P_1B_2D_1$.

As explained previously with reference to FIGS. 2A-2O, there are numerous coupling configurations between the drone(s) and the aerostatic module(s), as illustrated in FIG. 5. In this configuration $P_1B_2D_1$, the drone $D_1$ tows an aerostatic device $B_2$ comprising two aerostatic modules in the central recess of which a package $P_1$ has been placed and fixed.

The method for transporting and delivering packages according to the present disclosure has a high level of adaptability to delivery needs due to the modular nature of the various components of the aerial system. Thus, with reference to FIGS. 6A-6C, if one considers a delivery target for a batch $P_4$ of four packages having respective weights of 0.5 kg, 1.5 kg, 1.8 kg and 3.2 kg, the control and processing site determines the number of aerostatic modules that will have to be mobilized in the storage and distribution site to compensate, by the sum of their modular aerostatic lifts, for a total weight of 7 kg.

If each toroidal module has a volume of 1 m³ and a weight of 0.1 kg, at least eight modules would be needed to compensate for the cumulative weight of the batch of packages, for example, in the form of a stack (configuration $P_4B_8D_1$). It is also possible to combine aerial structures for greater efficiency in the delivery process.

If there are 4 packages to transport, the $P_4B_8D_1$ structure is best suited. The drone only has to use its energy to move the assembly in the airspace without worrying about the weight, resulting in saved energy and the possibility of reaching longer distances (here it is estimated that the range is multiplied by 5). The speed remains unchanged.

However, if one has the same situation 3 times (4 packages times 3 to be delivered), instead of using three independent $P_4B_8D_1$ structures, they will be grouped together, and 2 propulsion drones will therefore be saved. Hence, the structure $(P_4B_8)_3D_1$ in which the elements are free.

For better aerodynamics of the aerial system and faster delivery, it is also possible to join the elements and increase the number of drones, here 3 including 1 that will be temporarily active (the one in gray), which corresponds to the structure $(P_4B_8)_3D_3$.

It is also possible to envisage other configurations implementing other types of aerostatic modules having smaller volumes, for example, and therefore lower lifts.

Another advantage provided by the use of O-rings as aerostatic modules is that they can serve as airbags and package protection against impacts, but also with respect to living species (birds, humans, etc.). The assembly can land and take off again as is in inhabited areas.

The aerial package delivery systems according to the present disclosure are particularly suitable for medium-distance deliveries in B2C (Business to Consumer) mode and can contribute to increasing the range of an existing fleet of drones.

A description will now be given, with reference to FIGS. 7-13, of a practical embodiment of an aerial system according to the present disclosure for a multi-package long-distance aerial delivery. Consider (1) (FIG. 7) a propulsion drone equipped with an orientable magnetic arm provided at its distal end with a magnet or a controlled electromagnet. This drone arrives, at the delivery site (2) (FIG. 8), to an aerostatic device previously configured to comprise a set of aerostatic modules magnetically coupled together so as to produce an aerostatic cylindrical container inside which packages have been placed. The drone magnetically couples to an upper surface made from ferromagnetic material of the aerostatic container by way of its magnetic arm.

The number of aerostatic modules constituting this aerostatic device has been determined beforehand in order to present a cumulative aerostatic lift, balancing at least the overall weight of the packages transported and of the aerostatic device. It is also possible to provide a number of aerostatic modules leading to a greater cumulative aerostatic lift that balances the cumulative weight of the aerostatic device, of the packages and of the drone.

The drone takes off and tows (3) (FIG. 9) the aerostatic device containing the packages, this aerostatic device then being able to be substantially at the same altitude (4a) (FIG. 10A) as the towing drone. It is also possible to provide a combination of two aerostatic devices coupled and towed by two drones (4b) (FIG. 10B).

On approaching the delivery site, the drone towing the aerostatic device begins a descent (5) (FIG. 11) until it lands and deposits (6) (FIG. 12) the aerostatic device on the ground. The aerostatic device is then fixed to the ground and secured, then the packages are extracted from inside the aerostatic device. The drone can then leave (7) (FIG. 13) by towing the aerostatic device without the packages. A ballast can be provided in order to rebalance the aerostatic device.

In a specific embodiment of the present disclosure, it is possible to provide an initial drone that becomes inactive (or temporarily active) when coupled to a non-motorized aerostatic device. One or more propulsion drones fix themselves to the assembly and see to the propulsion in the airspace, resulting in the possibility of reaching longer distances and higher speeds (it suffices to add thrusters).

When a propulsion drone has no more energy, it is replaced by a new one, which would make it possible to reach theoretically unlimited distances.

Another mode of operation concerns fast B2B (Business to Business) long-distance deliveries, for example, for logistics operations between two warehouses separated by the sea.

A description will now be given of non-limiting examples of coupling of an aerostatic device made from a set of aerostatic modules B, a propulsion drone D and packages P, within the scope of the present disclosure.

The couplings between the various elements P, B, D can be of various natures: PP, BB, PB, BD, DP and DD.

These couplings are of the temporary and reversible type and, for example, implement mechanical, electrical, electrostatic, electromagnetic, magnetic, chemical or self-gripping connections (for example, of the VELCRO® type). One or more intermediate coupling parts can also be provided in the context of the present disclosure.

It is also possible to provide combinations of several types of couplings in the same aerial system according to the present disclosure. Thus, with reference to the $(P_4B_8)_3D_1$ configuration shown in FIG. 6B, the aerial system can implement a magnetic coupling between the packages (PP), a magnetic coupling between the balloons (BB), a magnetic coupling between the package(s) and the aerostatic device (PB) and a mechanical coupling between the balloons and the drone (BD).

More generally, and in a bio-inspired approach, the aerial systems according to the present disclosure can be likened to chemical molecules and the couplings between the various components of these aerial systems can then be likened to "chemical bonds," which can therefore be single, double or triple, which would correspond to variable levels of coupling. For example, if one considers a mechanical connection by cable between a propulsion drone D and an aerostatic device B, it is possible to provide:

- a first level of coupling  corresponding to the use of a single cable,
- a second level of coupling  corresponding to the use of two cables, and
- a third level of coupling  corresponding to the use of three cables.

Of course, the present disclosure is not limited to the embodiment that has just been described, and many other embodiments can be envisaged without departing from the scope of the present disclosure. Thus, the carrier gas present in the aerostatic modules can be helium or hydrogen, or else a combination of these two gases. The geometry of the modules can be variable and adapted to specific structures of packages or drones. Toroidal aerostatic modules can be in the form of a closed ring or else in the form of a horseshoe. The cross-section of the toroids can be arbitrary and depend on, in particular, the distribution and/or recovery modes of these modules. These aerostatic modules can have a rigid, semi-rigid or flexible structure, such as a tire.

Unmanned motorized aircraft, such as drones, can have various modes of propulsion, in particular, electric, thermal or hybrid, with different energy sources such as solar or hydrogen.

It should be noted that packages within aerial systems have no limitation in terms of container or content. The container can be cardboard, fabric, plastic, metals or alloys, natural fibers, polymers, recycled materials, carbon fiber, graphene, isothermal materials, or any other material, regardless of its form.

The content includes any type of manufactured objects or products, machines (3D printers, scientific instruments, etc.), computer systems (smartphones, modules with a 4G or 5G antenna, high-resolution cameras, etc.), foodstuffs (pizzas, prepared foods, etc.), fluids (water, carbon dioxide, etc.), chemical and electrochemical compounds (drugs, batteries for electric vehicles, etc.) or living and biological systems (organs, blood, animals, plants, human beings).

The sites for storing and distributing aerostatic modules, as well as the sites for recovering and storing these modules, can be arranged on a fixed or mobile support, in a covered place or outside, on land, on the water, or in the air.

The invention claimed is:

1. An unmanned aerial system for transporting and delivering packages, comprising:
    at least one unmanned motorized aircraft;
    at least one non-motorized aerostatic device having aerostatic lift and being able to be coupled to the at least one motorized aircraft; wherein the at least one motorized aircraft and the at least one non-motorized aerostatic device are configured to cooperate to transport at least one package from a take-off site to a delivery site; and
    at least one storage and distribution site for storing and distributing aerostatic modules each having a predetermined modular aerostatic lift, the storage and distribution site being configured to deliver a set of j aerostatic modules on demand, which modules are secured by coupling means, so as to constitute the aerostatic device with a static lift that is substantially greater than or equal to the overall weight of the package to be transported and of the aerostatic device;
    wherein the aerostatic modules comprise a support structure of closed or open toroidal geometry and filled with a gas lighter than air; and
    wherein the support structure comprises means for receiving at least part of the motorized aircraft carrying a package, in a central part of the support structure, and means for coupling the motorized aircraft to the support structure;
    wherein the storage and distribution site comprises a distributor cylinder filled with a plurality of aerostatic modules,
    the distributor cylinder being arranged to release the set of j aerostatic modules, after the motorized aircraft, on approach to an upper part of the distributor cylinder, is controlled to be mechanically coupled to the set of aerostatic modules.

2. The aerial system of claim 1, wherein the at least one storage and distribution site is further configured to deliver a set of j modules so as to provide an aerostatic device having a static lift substantially greater than or equal to the overall weight of the at least one package, the aerostatic device and the at least one motorized aircraft.

3. The aerial system of claim 1, wherein the at least one storage and distribution site comprises means for coupling the aerostatic device resulting from the j secured aerostatic modules to the motorized aircraft.

4. The aerial system of claim 1, further comprising at least one recovery and storage site for the recovery and storage of aerostatic modules, the recovery and storage site being configured to collect aerostatic modules previously decoupled from motorized aircraft.

5. The aerial system of claim 4, wherein the at least one recovery and storage site comprises means for decoupling the aerostatic device from the motorized aircraft.

6. The aerial system of claim 1, wherein the at least one distribution and storage site is also configured to collect aerostatic modules previously decoupled from motorized aircraft.

7. The aerial system of claim 4, wherein the at least one storage and distribution site and/or the at least one recovery and storage site comprises a silo arranged to store a stack of aerostatic modules.

8. The aerial system of claim 1, wherein at least one support structure comprises means for securing the motorized aircraft to the aerostatic module.

9. A storage and distribution site for aerostatic modules comprising:
   aerostatic modules, each aerostatic module having a predetermined modular aerostatic lift,
   the storage and distribution site being configured to deliver a set of j aerostatic modules on demand, the aerostatic modules secured by coupling means, so as to constitute an aerostatic device with a static lift that is substantially greater than or equal to the overall weight of a package to be transported and of the aerostatic device, and
   a distributor cylinder filled with a plurality of aerostatic modules, the distributor cylinder being arranged to release a set of j aerostatic modules on demand after a motorized aircraft, on approach to an upper part of the distributor cylinder, is controlled to be mechanically coupled to the set of j aerostatic modules.

10. The storage and distribution site of claim 9, wherein the aerostatic modules comprise a support structure of closed or open toroidal geometry and filled with a gas lighter than air, the support structure comprising means for receiving at least part of a motorized aircraft carrying a package, in a central part of the support structure, and means for coupling the motorized aircraft to the support structure.

* * * * *